(12) United States Patent
Brack et al.

(10) Patent No.: US 7,759,456 B2
(45) Date of Patent: Jul. 20, 2010

(54) BRANCHED POLYCARBONATE RESINS AND PROCESSES TO PREPARE THE SAME

(75) Inventors: Hans-Peter Brack, Herrliberg (CH); Bernd Jansen, Bergen Op Zoom (NL); Jan Henk Kamps, Bergen op Zoom (NL); Edward Kung, Bergen op Zoom (NL); Jan Pleun Lens, Breda (NL); Hans Looij, Bergen op Zoom (NL); Han Vermeulen, Hoeven (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 724 days.

(21) Appl. No.: 11/623,847

(22) Filed: Jan. 17, 2007

(65) Prior Publication Data

US 2008/0004426 A1    Jan. 3, 2008

Related U.S. Application Data

(60) Provisional application No. 60/862,555, filed on Oct. 23, 2006, provisional application No. 60/806,304, filed on Jun. 30, 2006.

(51) Int. Cl.
  *C09J 3/00* (2006.01)
  *C08G 64/40* (2006.01)
  *C08G 64/06* (2006.01)
  *C08G 64/14* (2006.01)

(52) U.S. Cl. ...................... 528/481; 528/204

(58) Field of Classification Search ........................ None
See application file for complete search history.

(56) References Cited

U.S. PATENT DOCUMENTS

| | | | |
|---|---|---|---|
| 3,021,305 A * | 2/1962 | Goldberg | 525/462 |
| 4,831,105 A * | 5/1989 | Schissel | 528/204 |
| 5,041,523 A * | 8/1991 | Kuze et al. | 528/204 |
| 5,693,722 A | 12/1997 | Priddy, Jr. et al. | |
| 6,268,462 B1 | 7/2001 | Okamoto et al. | |
| 6,291,631 B1 | 9/2001 | Lemmon et al. | |
| 6,303,737 B1 | 10/2001 | Lemmon et al. | |
| 6,307,006 B1 | 10/2001 | Konig et al. | |
| 6,323,304 B1 | 11/2001 | Lemmon et al. | |
| 6,365,710 B1 * | 4/2002 | Wang et al. | 528/480 |
| 6,376,640 B1 | 4/2002 | Lemmon et al. | |
| 6,395,862 B1 | 5/2002 | Lemmon et al. | |
| 6,504,002 B1 | 1/2003 | Karlik et al. | |
| 6,770,731 B2 | 8/2004 | Mason et al. | |
| 6,870,025 B2 | 3/2005 | McCloskey et al. | |
| 2003/0149223 A1 | 8/2003 | McCloskey et al. | |
| 2003/0236384 A1 | 12/2003 | Silvi et al. | |
| 2005/0143554 A1 | 6/2005 | Dhara et al. | |
| 2005/0192424 A1 * | 9/2005 | Shafer et al. | 528/196 |

FOREIGN PATENT DOCUMENTS

| | | | |
|---|---|---|---|
| EP | 0708130 A1 | 4/1996 | |
| JP | 62222812 | * | 9/1987 |
| JP | 09059371 | | 3/1997 |
| WO | 0047679 A1 | | 8/2000 |

OTHER PUBLICATIONS

Lai, Thermotropic Polyester Carbonates III . . . ; Journal of Applied Polymer Science vol. 36 (1988) pp. 819-827.*

* cited by examiner

*Primary Examiner*—David Buttner
(74) *Attorney, Agent, or Firm*—Larson & Anderson, LLC

(57) ABSTRACT

A method of increasing the branching and polydispersity of a polycarbonate includes the steps of: (a) including in the polycarbonate at least one species of an alkyl substituted monomer, and (b) treating the polycarbonate at an elevated temperature and for a sufficient time to increase the branching and polydispersity relative to an otherwise equivalent polycarbonate without alkyl substituents.

24 Claims, 2 Drawing Sheets

Proton NMR spectra of a BPA/MeHQ polycarbonate copolymer melt polymerized with BMSC using (a) extruder conditions designed to generate a branch the copolymer (i.e. at temps of 340 °C) and (b) normal extruder conditions not causing branch formation

BRANCHED POLYCARBONATE RESINS AND PROCESSES TO PREPARE THE SAME

CROSS REFERENCE TO RELATED APPLICATIONS

This application is a non-provisional of U.S. Patent Application No. 60/862,555, filed Oct. 23, 2006; and is related to and claims the benefit of U.S. patent application Ser. No. 11/456,991 filed on Jul. 12, 2006; and U.S. Patent Application No. 60/806,304 filed on Jun. 30, 2006 all of which are pending and herein incorporated herein by reference.

BACKGROUND OF THE INVENTION

Branched polycarbonates having increased melt strength are useful for applications such as blow molding and extrusion blow molding extrusion processes for the production of polymer profiles, solid sheets, multi-wall sheets or corrugated sheets. In addition, branching of polycarbonates will generally also improve their flame retarding behavior and chemical resistance. Processes of the past for producing branched polycarbonates often require long transition times in the process, additional raw materials like branching agents, or high levels of added catalyst. There is a need for a ready method to branch polycarbonates that overcomes the deficiencies of past processes.

SUMMARY OF THE INVENTION

The present invention provides methods to branch polycarbonates without the need for long transition times in the melt process, additional raw materials like branching agents, or high levels of added Fries-inducing catalysts which lead to excessive color formation and product instability. The methods of the invention make use of alkyl substituted monomers incorporated in the polycarbonate and treating the polycarbonate at an elevated temperature and for a sufficient time to increase the branching and polydispersity relative to an otherwise equivalent polycarbonate without alkyl substituents. Furthermore the branched polymers produced by the methods of the present invention may be generated from polycarbonates that have been polymerized by the interfacial polymerization method using phosgene as the carbonate source or by the melt polymerization methods using diphenyl carbonate (DPC) or bismethylsalicylcarbonate (BMSC).

In one embodiment of the present invention a method of increasing the branching and polydispersity of a polycarbonate is provided comprising the steps of:

(a) including in the polycarbonate at least one species of an alkyl substituted monomer, and (b) treating the polycarbonate at an elevated temperature and for a sufficient time to increase the branching and polydispersity relative to an otherwise equivalent polycarbonate without alkyl substituents.

In another embodiment of the present invention a branched polycarbonate is provided. The branched polycarbonate will have alkyl branching units between polymer chains. It has been found that this branching unit is detectable using NMR equipment. Thus, in another embodiment the present invention provides a polycarbonate having a broad NMR band centered at a chemical shift of between about 3.95 and 4.05 ppm in a proton NMR spectrum using the NMR analytical methods described in this application.

DETAILED DESCRIPTION OF THE INVENTION

Figure 1:
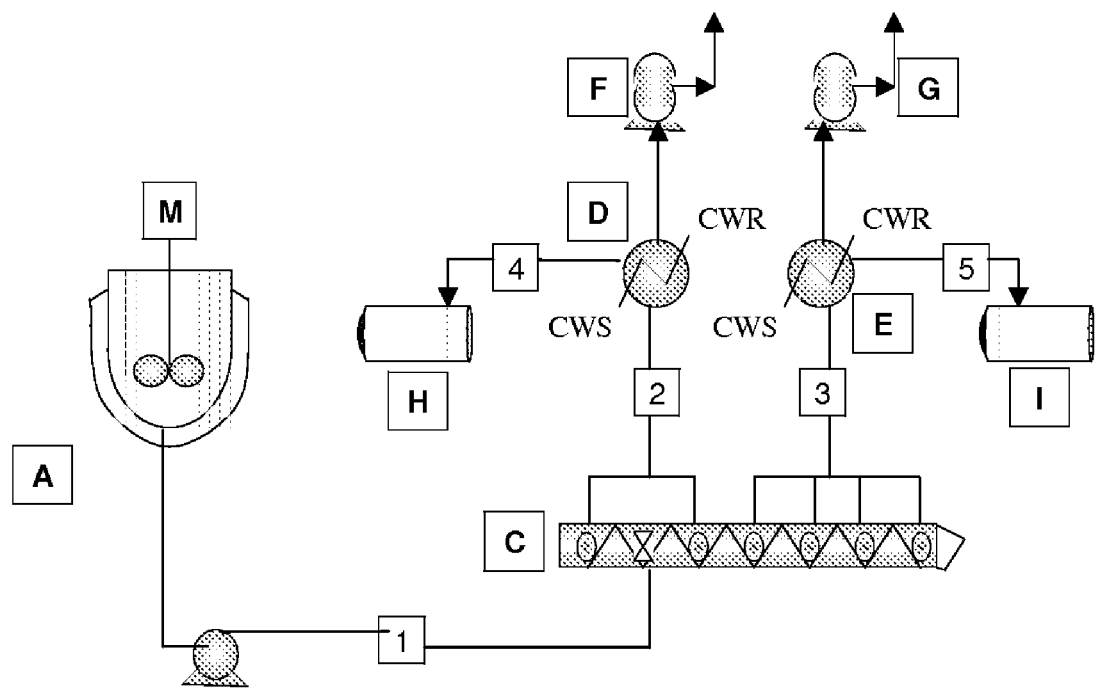
FIG. 1 is a polymerization reaction system.

Branched polycarbonates have increased melt strength and are therefor useful in applications such as blow molding and extrusion blow molding processes for the production of profiles, solid sheets, multi-wall sheets or corrugated sheets. In addition, branched polycarbonates will also generally have improved flame retarding behavior and chemical resistance compared to unbranched polycarbonates.

The present invention provides methods to branch polycarbonates without the need for long transition times in the melt process, additional raw materials like branching agents, or high levels of added Fries-inducing catalysts which generally also lead to excessive color formation and product instability. The methods of the invention make use of alkyl substituted monomers incorporated in the polycarbonate and treating the polycarbonate at an elevated temperature and for a sufficient time to increase the branching and polydispersity relative to an otherwise equivalent polycarbonate without alkyl substituents. Furthermore the branched polymers produced by the methods of the present invention may be generated from polycarbonates that have been polymerized by the interfacial polymerization method using phosgene as the carbonate source or by the melt polymerization methods using diphenyl carbonate (DPC) or bismethylsalicylcarbonate (BMSC).

Without being bound to a particular mechanism, it is believed that an alkyl substituent(s) (for example those on an aromatic ring) of the alkyl substituted monomer in a polymer chain reacts with another alkyl substituent or aromatic ring of an alkyl substituted monomer on a second chain (or another alkyl substituted monomer in the same chain) through a radical addition mechanism. It is believed that this radical addition reaction creates covalent linkages between chains by means of bridging alkyl groups.

The method of increasing the branching and polydispersity of a polycarbonate provided by the present invention comprises the steps of:

(a) including in the polycarbonate at least one species of an alkyl substituted monomer, and (b) treating the polycarbonate at an elevated temperature and for a sufficient time to increase the branching and polydispersity relative to an otherwise equivalent polycarbonate without alkyl substituents.

DEFINITIONS

Reference herein will be made to a number of terms which shall be defined to have the following meanings:

The singular forms "a", "an" and "the" include plural referents unless the context clearly dictates otherwise.

The term "including" as it is used in conjunction with step (a) of the presently disclosed methods (i.e. (a) including in the polycarbonate at least one species of an alkyl substituted monomer) is herein understood to mean that the treated polycarbonate is made from a monomer source comprising one species or more of the alkylated monomers described herein.

"Polycarbonate" refers to polycarbonates incorporating repeat units derived from at least one dihydroxy aromatic compound and includes copolyestercarbonates, for example a polycarbonate comprising repeat units derived from methyl hydroquinone, bisphenol A, and dodecandioic acid. The polycarbonates that are the subject of the methods of the present invention are those that have (i.e. include) at least one species of repeat unit derived from an alkylated monomer. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds. The term "polycarbonate" encompasses poly(carbonate-coester) oligomers and polymers.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

"Alkylated monomer", "alkyl monomer", and "alkyl substituted monomer" are used interchangeably herein.

"Treating the polycarbonate" as it is used herein is understood to mean that the polycarbonate is introduced to an environment having an elevated temperature for a sufficient time to increase the branching and polydispersity of the polycarbonate from a point where it was prior to being introduced to the elevated temperature environment. The step of treating the polycarbonate can occur during melt formation of the polycarbonate from monomers or oligmers, compounding, and/or molding. The amount of increase in branching and polydispersity is greater than an otherwise equivalent polycarbonate without alkyl substituents being subject to the same conditions.

"An otherwise equivalent polycarbonate without alkyl substituents" means that the polycarbonate is not derived from an alkylated monomer source but otherwise contains the same amounts of the same types of non-alkylated monomers and is produced from the same type of reaction (e.g. melt or interfacial). For example polycarbonate having repeat units derived from hydroquinone (HQ) is "an otherwise equivalent polycarbonate without alkyl substituents" of a polycarbonate derived from methylhydroquinone (MeHQ) monomer, methyl being the alkyl substituent in this case.

(a) The Alkylated Monomer

The polycarbonates of the present invention have at least one species of an alkylated monomer. The "alkylated" or "alkyl substituted" portion of the monomer is preferably in the form of an alkyl substituent disposed on a cyclic ring (e.g. the "R" group as discussed below with regard to figures a, c, and e). In one embodiment at least one species of an alkylated monomer is selected from the group consisting of:

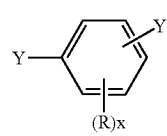

(a)

wherein each substituent Y is independently a hydroxy, an alcohol, an ester, or a carboxylic acid functional group, each substituent R is independently a $C_1$ to $C_6$ branched, linear, or cyclic aliphatic group, each x is an integer between 1 and 4 inclusive, and the sum of all x's is less than or equal to 4,

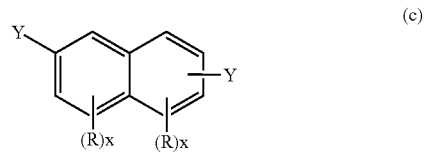

(c)

wherein each substituent Y is independently a hydroxy, an alcohol, ester or carboxylic acid functional group, each substituent R is independently a $C_1$ to $C_6$ branched, linear, or cyclic aliphatic group, each x is a zero or an integer between 1 and 3 inclusive, and the sum of all x's is at least 1 and less than or equal to 6, and

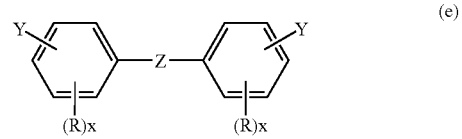

(e)

wherein each substituent Y is independently a hydroxy, an alcohol, ester or carboxylic acid functional group, each substituent R is independently a $C_1$ to $C_6$ branched, linear, or cyclic aliphatic group, each x is a zero or an integer between 1 and 4 inclusive, the sum of all x's is at least 1 and less than or equal to 8, and Z represents one of the groups of formula:

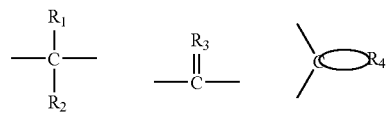

wherein $R_1$, $R_2$ and $R_3$ are independently a $C_1$ to $C_{18}$ branched, linear, or cyclic aliphatic group, and $R_4$ is a $C_3$ to $C_{12}$ cyclic substituent. In particularly preferred embodiments each R substituent is independently a $C_1$ to $C_4$ branched or linear aliphatic group, for example wherein each R substituent is independently a $C_1$ or a $C_2$ aliphatic group, for example wherein each R substituent is a methyl group.

A non-limiting list of preferred alkylated monomer species that are suitable for use in accordance with the present invention is methylhydroquinone, tert-butylhydroquinone, DMBPC i.e. bis(3-methyl-4-hydroxyphenyl)cyclohexane, 2,2'-Thiobis(4-t-octylphenol), TMBPA (tetra-methyl bisphenol acetone), DMBPA (di-methyl bisphenol acetone), DEBPA (di-ethyl bisphenol acetone), di-ortho-isopropyl-BPA, di-ortho-sec-butyl-BPA, di-ortho-tert-butyl-BPA, bis-orthocresol flourene, methyl resorcinol, di-tert-butyl resorcinol, and di-tert-butyl hydroquinone.

In a particularly preferred embodiment at least one species of alkylated monomer used in the polycarbonate is tertiary-butyl hydroquinone which has the structure:

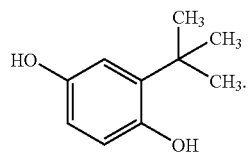

Therefore in another embodiment the present invention provides for a polycarbonate comprising a polycarbonate repeat unit derived from a t-butyl hydroquinone monomer source.

The polycarbonates of the invention may also include non-alkylated monomers. As is known in the art, the selection of such monomers is determined by the properties desired for the final polymer material and any of the monomers known in the art may be used. By way of non-limiting example, the monomers depicted in (a), (c) and (e) above may be used as non-alkylated monomers when the R groups are not alkyl (for example when the R groups are a hydrogen or a halogen).

It is believed that the amount of alkylated monomer within the polycarbonate correlates to the opportunity of cross-linking or branching between the polycarbonate chains. In one embodiment, the alkylated monomer is present in the polycarbonate in an amount greater than 10 mole percent based on the total moles of monomers in the polycarbonate. In other embodiments the alkylated monomer is present in the polycarbonate in an amount greater than 20 mole percent, for example greater than 30 mole percent, greater than 40 mole percent, greater than 50 mole percent, greater than 60 mole percent, greater than 70 mole percent, greater than 80 mole percent, or greater than 90 mole percent, based on the total moles of monomers in the polycarbonate (e.g. wherein 100 mole percent of the monomers are alkylated monomers).

(b) Treating the Polycarbonate:

The step of treating the polycarbonate at an elevated temperature and for a sufficient time to increase the branching and polydispersity relative to an otherwise equivalent polycarbonate without alkyl substituents can occur in any one or all of three different stages. First, if the polycarbonate is prepared by a melt transesterification reaction, for example one using a diaryl carbonate (e.g. DPC) or an ester-substituted diaryl carbonate (e.g. BMSC), the treating step may occur at some point during the melt transesterification reaction. Second, irrespective of how the polycarbonate is made, the treating step can occur during a melt-mixing/compounding step where optional additional compounds may be added to the polycarbonate or where the polycarbonate is simply treated to produce the branching according to the present invention. Thirdly, and again irrespective of how the polycarbonate is made, the treating step may occur during the molding of the polycarbonate into an article of manufacture.

As can be seen from a consideration of the examples herein, the specific time and temperature required to achieve a given level of polydispersity depends on the stage of the process when treatment occurs and on the nature and relative amount of alkylated monomer that is included. Drawing on the teaching of this application, however, the person skilled in the art will be able to readily ascertain appropriate treatment conditions for a given polymer.

1. Treating During Melt Polymerization or Transesterification:

The melt polymerization/transesterification reaction between the free hydroxy ends of dihydroxy compounds and a carbonate source is well known. Molecular weight of polycarbonate may be built by melt transesterifying the free hydroxy ends of dihydroxy compounds with a carbonate source such as DPC. It is also well known, that the rate of the transesterification reaction can be increased by using ester-substituted diaryl carbonates such as BMSC. This increase in rate allows for the production of polycarbonate to occur on a reactive extruder.

The present invention provides that increased branching and polydispersity of polycarbonate increases where during the melt polymerization reaction the polycarbonate is treated at an elevated temperature and for a sufficient time to result in a polycarbonate having a polydispersity of greater than 2.3, for example a polydispersity greater than 2.4, greater than 2.5, and greater than 2.6. Typically the temperature where such branching and increase in polydispersity occurs during the melt polymerization is at a temperature of greater than 330° C., for example at a temperature greater than 340° C. or greater than 350° C.

The examples and results provided below in Table 1 of the Example section demonstrate that increasing the temperature of a reactive extruder operating under melt polymerization conditions increases the branching and polydispersity of the resulting polycarbonate derived from alkylated monomers.

As will be apparent to one skilled in the art after reading the present disclosure, the residence time of the polycarbonate required in the equipment will vary depending on the temperature under which the equipment is operated. For example, if a higher temperature is used a shorter residence time is required and vice versa. Residence times within a melt devolatilization extruder can be varied by altering the flow rate of polymer within the extruder, by altering screw conditions such as speed, diameter, and elements, inter alia.

2. Treating During a Melt-Mixing/Compounding Step:

Regardless of how the polycarbonate is made (i.e. whether it is made via an interfacial polymerization, a solid state polymerization, or a melt polymerization, inter alia), the treating step can occur during compounding step in which the polymer is exposed to heat (e.g. a melt mixing step). Typically a compounding step allows for the incorporation of additional compounds into the polycarbonate. The additional compound may include for example heat stabilizers, antidrip agents, and/or antioxidant preservatives among others. However, in the present invention the compounding step may occur without the addition of optional additives where the polycarbonate is only treated to create the branching described herein.

During the compounding step the polycarbonate is treated at an elevated temperature and for a sufficient time to increase the polydispersity of the polycarbonate by greater than 10 percent. In preferred embodiments the polydispersity is increased during the compounding step in an amount greater than 20 percent, greater than 30 percent, greater than 40 percent, greater than 50 percent, greater than 60 percent, greater than 70 percent, greater than 80 percent, greater than 90 percent, greater than 100 percent, greater than 110 percent, greater than 120 percent, greater than 130 percent, greater than 140 percent, greater than 150 percent, greater than 160 percent, greater than 170 percent, greater than 180 percent, greater than 190 percent, greater than 200 percent, greater than 210 percent, greater than 220 percent, greater than 230 percent, and greater than 240 percent.

Typically the compounding step will occur at a temperature greater than 330° C., for example at a temperature greater than 350° C., or 370° C. As will be apparent to one skilled in the art, the residence time of the polycarbonate required in the equipment will vary depending on the temperature, the type of polycarbonate, and the amount and type of alkylated monomer in the polycarbonate. For example, in one embodiment the polycarbonate will be treated during a compounding step at a temperature greater than 330° C. for a time greater than or equal to 20 minutes, greater than or equal to 40 minutes, greater than or equal to 60 minutes, or more. The data contained below in tables 2A-2C of the example section further demonstrates the concepts of treating the polycarbonate during a compounding step and the relationship between these factors.

3. Treatment During Molding:

Regardless of how the polycarbonate is made and whether or not it has been previously compounded, the treating step may occur during the molding of the polycarbonate into an article of manufacture. During the molding step the polycarbonate is treated at an elevated temperature and for a sufficient time to increase the polydispersity of the polycarbonate by greater than 10 percent. In preferred embodiments the polydispersity of the polycarbonate is increased during the molding step by greater than 12 percent, for example greater than 14 percent, greater than 16 percent, greater than 18 percent, greater than 20 percent, greater than 22 percent, greater than 24 percent, greater than 26 percent, greater than 28 percent, greater than 30 percent, greater than 32 percent, greater than 34 percent, greater than 36 percent, greater than 38 percent, greater than 40 percent, greater than 42 percent, greater than 44 percent, greater than 46 percent, greater than 48 percent, greater than 50 percent, and greater than 52 percent.

Typically the molding step occurs at an elevated temperature such as greater than 320° C., greater than 330° C., and/or greater than 340° C., for a period of time greater than 10 minutes, for example a period of time greater than 15 minutes, greater than 20 minutes, greater than 25 minutes, and greater than 30 minutes. As will be apparent to one skilled in the art after reading the present disclosure, the residence time of the polycarbonate required in the molding equipment will vary depending on the temperature of the equipment and visa versa. The data contained below in table 4 of the example section further demonstrates the concepts of treating the polycarbonate during a molding step.

One skilled in the art will appreciate that the step of treating the polycarbonate may occur in any one or in any combination of the above-enumerated stages.

The Polycarbonate of the Present Invention:

The methods of the present invention provide increased branching, melt stability and polydispersity of polycarbonates having alkylated monomers. In certain embodiments the polycarbonate produced comprises branching units of:

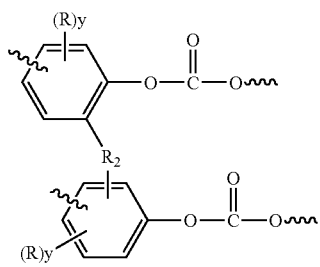

(g)

wherein R is as described above with regard to figures a, c, e, and f, y is an integer between 0 and 3, and $R_2$ is a $C_1$ to $C_{12}$ linear or branched alkyl group. In other embodiments the polycarbonate produced comprises branching units of:

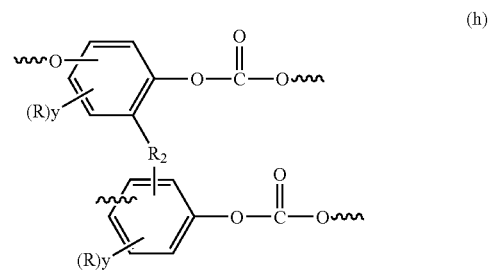

(h)

wherein R is as described above with regard to figure g, y is an integer between 0 and 3, and $R_2$ is a $C_1$ to $C_{12}$ linear or branched alkyl group. In another embodiment the polycarbonate produced comprises branching units of:

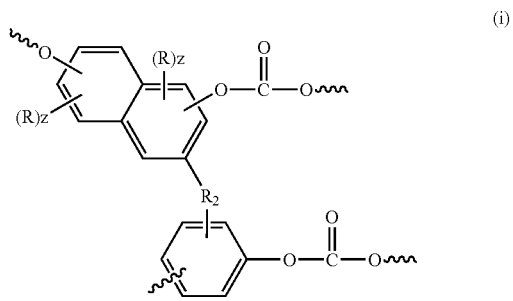

(i)

wherein R is as described above with regard to figure g, z is an integer between 0 and 2, and $R_2$ is a $C_1$ to $C_{12}$ linear or branched alkyl group. In one embodiment $R_2$ is selected from the group consisting of methyl ethyl, tertiary-butyl, and octyl.

Depending on the temperature and residence times used in the methods described above as well as the amount of alkylated monomer used to prepare the polycarbonate the polycarbonate may have a detectable broad NMR band centered at a chemical shift of between about 3.95 and 4.05 ppm in a proton NMR spectrum according to the detection limits set forth below.

EXAMPLES

Having described the invention in detail the following examples are set forth to provide those of ordinary skill in the art with a detailed description of how the methods claimed herein are evaluated, and are not intended to limit the scope of what the inventors regard as their invention. Unless indicated otherwise, parts are by weight and temperature is in ° C.

Molecular Weight Determination

The molecular weight properties of the polymers were determined by gel permeation chromatographic (GPC) analysis, using Polystyrene molecular weight standards to construct a broad standard calibration curve against which polymer molecular weights were determined. The temperature of the gel permeation columns was about 25° C. and the mobile phase was chloroform. The solvent used was a 4:1 mixture of CHCl3 (for the terpolymer, the 60% HQ copolymer and the 90% MeHQ copolymer CHCl3 was used in combination with 1,1,1,3,3,3-hexafluoroisopropanol (HFIP)). The terpolymer was first treated in an ultrasonic bath for 15 minutes followed by shaking for 2 hours. The Polydisperity Index (PDI) is calculated by dividing the weight average molecular weight by the number average molecular weight (Mw/Mn).

NMR Analysis

All NMR spectra were obtained on a Bruker Avance 400 MHz Spectrometer at a temperature of 55° C. For the analysis a solution of 5% wt/v in 1,1,2,2-Tetrachloroethane-d2 (CAS#33685-54-0) was prepared. All spectra were obtained with a spin-rate of 20 Hz. The $^1$H NMR measurements were done at 400 MHz with a 5 mm diameter QNP probe, using a sweep width of 6410 Hz (13--−3 ppm chemical shift range) with a 30° flip angle, 10 second relaxation time, 64 k data points and 256 scans. All data processing was performed using the GRC developed processing package (developed by T. A. Early, internal publication 94CRD204). Processing included apodization with 0.3 Hz for $^1$H NMR. As used in this application, reference to a detectable NMR peak refers to detectability using this methodology. It will be appreciated that less sensitive techniques may not be able to detect the peak.

Melt-Volume Rate

The melt strength is a measure of complex Theological properties of the polymer that can be expressed by the melt index ratio (MIR). This is the ratio of the melt volume rate (MVR) measured with a weight of 2.16 kg and the MVR measured with a weight of 21.6 kg. The complex rheology results from branching in the polycarbonate terpolymer. Branched polycarbonates are known to have higher melt strengths than linear ones. The test temperature used was 280° C.

Parallel Plate Rheology

Besides MIR also the shear thinning behavior of a polymer can be used to characterize melt-strength. As mentioned branched polycarbonates have higher melt strengths than linear ones. It is also known that branching results in a stronger shear-thinning behavior. Therefore parallel plate rheology testing has been performed on the terpolymers made with various melt temperatures on the S-extrusion system. For each sample a frequency sweep between 0.1 and 500 rad/sec has been performed at two melt temperatures, i.e. 240 and 260° C. Using the resulting data, the melt temperature (PPT) is calculated at which the complex viscosity at 100 rad/sec equals 2000 Pa sec. It is made sure that the resulting melt temperature falls in between the actual test temperatures to allow interpolation. At the resulting melt temperature also the complex melt viscosity at a shear rate of 1 rad/sec is determined. The R* is now calculated as the ratio between the complex melt viscosity at 1 rad/sec over the complex melt viscosity at 100 rad/sec, where the latter is fixed at the interpolated 2000 Pa sec. A higher R* value indicates a strong shear thinning behavior and hence a higher melt strength due to branching.

1. Treating the Polycarbonate During Melt Polymerization

The melt polymerization process using an activated diaryl carbonate (BMSC) has been utilized to produce several terpolymers consisting of BPA, HQ and MeHQ in the molar ratio of 33/33/34. By applying various melt temperature during polymerization in a reactive extruder materials with higher polydispersity have been made. As can be observed in the attached table, the melt-strength of these materials as characterized by R* and MIR is increased. Therefore it is demonstrated that a controlled increase of the extruder melt temperature can be used to produce terpolymers with increased melt strength.

Samples 1, 2 and 3 are polycarbonate terpolymers made via the BMSC/melt reactive extrusion process. The samples were synthesized as follows. A stainless steel stirred tank reactor is charged with 11855 g BPA, 5891 g HQ, 6455.2 MeHQ, 53069 g BMSC and 561.4 g PCP for a molar ratio of BMSC/BPA+HQ+MeHQ of 1.021. Also added to the reactor was 2694 µl of an aqueous catalyst solution of tetramethyl ammonium hydroxide (TMAH) and sodium hydroxide (NaOH) in an amount corresponding to $2.5 \times 10^{-5}$ moles TMAH and $2.0 \times 10^{-6}$ moles of NaOH per total number of moles of BPA/HQ/MeHQ. The reactor was then evacuated and purged with nitrogen three times to remove residual oxygen and then held at a constant vacuum pressure of 800 mbar. The reactor was then heated to 170° C. in order to melt and react the mixture. After approximately 4 hr 11 min from the start of heating (of the reactor tank), the reactor was pressurized with nitrogen to a constant overpressure of 0.9 bar, and the molten reaction mixture was fed through a 170° C. heated feed-line into an extruder at a rate of 13.5 kg/h. 15 Minutes before starting the feed to the extruder 2694 µl of an aqueous catalyst solution of sodium hydroxide (NaOH) in an amount corresponding to $6.0 \times 10^{-6}$ moles of NaOH per total number of moles of BPA/HQ/MeHQ. The extruder is a W&P ZSK25WLE 25 mm 13-barrel twin-screw extruder with an L/D=59. The feed into the extruder comprised a flash-valve to prevent boiling of the molten mixture. The reaction mixture was reactively extruded at a screw speed of 300 rpm. The extruder was equipped with five forward vacuum vents and one back-vent. The methyl salicylate byproduct is removed via devolatilization through these vents. The vacuum pressure of the back-vent was 11 mbar. The vacuum pressure of the first forward vent was 21 mbar. The vacuum pressure of the final four forward vents was less than 1 mbar.

Sample 1 has been made with all the extruder barrels at a temperature of 300° C. and the extruder die head at a temperature of 310° C. Sample 2 has been made with barrel 1 to Barrel 4 at 300° C., barrel 5 at 305° C., barrel 6 at 309° C., barrel 7 at 312° C., barrel 8 at 312° C., barrel 9 at 318° C., barrel 10 to barrel 13 at 320° C. and the die head at 330° C. Sample 3 has been made with barrel 1 to Barrel 4 at 300° C., barrel 5 at 310° C., barrel 6 at 318° C., barrel 7 at 324° C., barrel 8 at 330° C., barrel 9 at 336° C., barrel 10 to barrel 13 at 340° C. and the die head at 350° C.

TABLE 1

Results of treating the polycarbonate during melt polymerization

| Sample # | Mw (PC) g/mol | Mn (PC) g/mol | PD | Tmelt C. | G' (1, ppt) Pa | ETA (1, ppt) Pa·s | PPT C. | R* | MVR 2.16 kg 280 C. cm3/10 min | MVR 21.6 kg 280 C. cm3/10 min | MIR | MeHQ peak at 4.1 ppm Mol % |
|---|---|---|---|---|---|---|---|---|---|---|---|---|
| 1 | 26036 | 11356 | 2.29 | 327 | 67.1 | 3066 | 244.7 | 1.53 | 11.53 | 142.5 | 1.24 | Below Detection Limit |
| 2 | 27874 | 11643 | 2.35 | 350 | 132.6 | 3577 | 246.2 | 1.79 | 7.95 | 109.7 | 1.38 | 0.27 |
| 3 | 29927 | 11940 | 2.46 | 368 | 209.2 | 4929 | 2559 | 2.16 | 6.23 | 77.57 | 1.49 | 0.43 |

The data in Table 1 indicates that increasing the melt temperature in the extruder can be used to create increased branching in alkylated monomer containing polycarbonates. Samples 2 and 3 were prepared at progressively higher melt temperatures versus sample 1. As the melt temperature is increased, it can be seen that the both the R* and MIR values systematically are increased. Therefore the melt strength of the terpolymer is systematically increased as the melt temperature is increased. At the same time, the peak in the proton NMR due to the branching units also increases systematically in accordance.

2. Treating the Polycarbonate During Melt-Mixing (e.g. Compounding)

Example 1

Study of Treatment During Compounding at 370° C.

To study the effect of temperature on polymers containing alkylated monomer residues, various polymers were melt mixed in a 25 gram scale reactor set up. To remove any sodium from the glass, the reactor was soaked in 1M HCl for at least 24 hours followed by rinsing at least 5 times with 18.2 M ohm. The temperature of the reactor was maintained using a heating mantle with a PID controller. The pressure over the reactor was controlled by a nitrogen bleed into a vacuum pump downstream of the distillate collection flasks and measured with a pressure gauge. The reactor was assembled, sealed and the atmosphere was exchanged with nitrogen three times. The reactor was brought to near atmospheric pressure and reaction time was started at the same moment the heaters were set to their first set point.

The reactor was set to 370° C., 800 mbar pressure and the overhead heated to 100° C. After 12 minutes the stirrers are switched on (40 rpm). When 60 minutes of melting time was reached the mixing was stopped. After completion, the reactor was brought back to atmospheric pressure with a gentle nitrogen flow. When atmospheric pressure was reached, the stirrers were stopped and the produced material was drained from the reactor tubes by opening the reactors at the bottom and pushing out the material with a slight nitrogen overpressure. The harvested material was then used for analysis.

homopolymer of BPA, which is not an alkyl-substituted bisphenol as defined in this application, nor for the copolymer with hydroquinone, which is not an alkyl-substituted aromatic dihydroxy compound as defined in this application. In addition, it can be seen that one can make branching with the polycarbonates polymerized interfacially using phosgene and in the melt using DPC or BMSC.

Example 2

Study of Treatment During Compounding Below 350° C.

The same reactor set-up and procedure as in the previous laboratory compounding example (i.e. Example 1) was used (except where noted) to study the effect of compounding at temperatures between 300 to 350° C., melt residence times of 20 to 40 minutes, and at concentrations of alkylated monomer of between 25 to 100 mole % (relative to the concentration of the incorporated diol residuals of the polymer) on the branching reaction.

After exchanging the atmosphere with nitrogen, the reactor was left under a nitrogen atmosphere (1,000 mbar) and the reaction time was started at the same moment that the heaters reached the desired temperature. After 5 minutes, the stirrers were switched on (40 rpm). When the desired melt residence time was reached, the stirrers were stopped, and the produced material was drained from the reactor tubes. The harvested material was then used for analysis by gel permeation chromatographic (GPC) analysis. The solvent used for preparing the polymer solutions for GPC analysis was $CHCl_3$, and all molecular weights are reported here relative to polystyrene standards.

The following polycarbonate samples were used in this example:

1. DMBPC homopolymer made by the interfacial polymerization process.

2. 50/50 (mole/mole) DMBPC/BPA copolymer made by the interfacial polymerization process.

3. 25/75 (mole/mole) DMBPC/BPA polymer blend was made by blending the previous 50/50 (mole/mole) DMBPC/BPA copolymer with an appropriate amount of a BPA homopolymer made by the interfacial polymerization process.

TABLE 2A

Results of treating the polycarbonate during compounding at 370° C.

| Polymer Tested (mole %) | Polymerization | Polymer prop. before mixing | | | Polymer prop. after mixing | | | Change in prop. | | |
| --- | --- | --- | --- | --- | --- | --- | --- | --- | --- | --- |
| | | Mw (PS) | Mn (PS) | Pd | Mw (PS) | Mn (PS) | Pd | Delta Mw | Delta Mn | Pd |
| BPA:MeHQ (10:90 Copolymer) | Melt/BMSC | | | | 55908 | 8983 | 6.22 | | | |
| BPA:HQ:MeHQ (33:34:33 Terpolymer) | Melt/BMSC | | | | 51944 | 8233 | 6.31 | | | |
| DMBPC (100 Homopolymer) | Melt/BMSC | 46460 | 20494 | 2.27 | 55691 | 9487 | 5.87 | 9231 | −11006 | 159 |
| BPA:tBHQ (20:80 Copolymer) | Melt/BMSC | 37351 | 17019 | 2.19 | 35256 | 5005 | 7.04 | −2095 | −12014 | 221 |
| BPA:HQ:MeHQ (33:34:33 Terpolymer) | Melt/DPC | 46224 | 20104 | 2.3 | 51830 | 11200 | 4.63 | 5606 | −8904 | 101 |
| BPA:HQ (40:60 Copolymer) | Melt/BMSC | 69826 | 19191 | 3.64 | 29562 | 8184 | 3.61 | −40264 | −11007 | −1 |
| BPA (100 Homopolymer) | Melt/BMSC | 61331 | 27113 | 2.26 | 19628 | 8320 | 2.36 | −41702 | −18792 | 4 |
| BPA:DMBPC (50:50 Copolymer) | Phosgene | 46148 | 16687 | 2.77 | 49263 | 16213 | 3.04 | 3115 | −474 | 10 |
| DMBPC (100 Homopolymer) | Melt/DPC | 48178 | 18834 | 2.56 | 45347 | 11319 | 4.01 | −2831 | −7515 | 57 |

It can be seen from Table 2A, that branching and an increase in polydispersity occurs only for polymers made from at least one alkyl-substituted phenol or bisphenol. For example, the polydispersity increases significantly for the terpolymer based on methyl hydroquinone, the homopolymer and copolymer of the alkyl-substituted bisphenol DMBPC, and the copolymers with the alkyl-substituted aromatic dihydroxy compounds MeHQ and t-ButHQ. In contrast, it can be seen that there is no increase in polydispersity for the 4. DMBPC homopolymer made by the melt (DPC) polymerization process was included for comparison purposes.

5. BPA homopolymer made by the interfacial polymerization process:

The molecular weight properties of these starting materials are given below in Table 2B, and the molecular weight properties of the compounded (melt-mixed) polymers are given below in Table 2C.

TABLE 2B

Starting materials containing various levels of alkylated monomer (DMBPC)

| mole % DMBPC | polymerization method | Mw (PS) | Mn (PS) | Pd |
|---|---|---|---|---|
| 0 | interfacial | 42894 ± 412 | 17731 ± 135 | 2.42 ± 0.01 |
| 25 | interfacial | 43547 ± 210 | 16561 ± 31 | 2.63 ± 0.01 |
| 50 | interfacial | 44044 ± 302 | 15528 ± 92 | 2.83 ± 0.01 |
| 100 | interfacial | 49376 ± 269 | 15923 ± 55 | 3.10 ± 0.01 |
| 100 | melt | 47888 ± 155 | 18656 ± 67 | 2.57 ± 0.01 |

TABLE 2C

Polymers compounded (melt mixed) at relatively lower temperatures

| | compounding process (melt-mixing) | | Product Polymer Properties after compounding (melt-mixing) | | | |
|---|---|---|---|---|---|---|
| mole % DMBPC | Temp (degree C.) | residence time (min) | Mw (PS) | Mn (PS) | Pd | % increase in Pd |
| 25 | 300 | 20 | 44574 | 18074 | 2.47 | 0 |
| 25 | 300 | 40 | 44972 | 18218 | 2.47 | 0 |
| 25 | 350 | 20 | 46884 | 19525 | 2.40 | 0 |
| 25 | 350 | 40 | 46051 | 18752 | 2.46 | 0 |
| 50 | 300 | 20 | 45737 | 16430 | 2.78 | 0 |
| 50 | 300 | 40 | 43655 | 15830 | 2.76 | 0 |
| 50 | 350 | 20 | 46600 | 16711 | 2.79 | 0 |
| 50 | 350 | 40 | 45711 | 16758 | 2.73 | 0 |
| 100 | 300 | 20 | 50944 | 17317 | 2.94 | 0 |
| 100 | 300 | 40 | 50556 | 17058 | 2.96 | 0 |
| 100 | 350 | 20 | 51011 | 16753 | 3.04 | 0 |
| 100 | 350 | 40 | 61348 | 16800 | 3.65 | 17.7 |
| 100 (melt) | 350 | 40 | 52524 | 13929 | 3.77 | 46.7 |

The results of the compounding (melt-mixing) examples conducted in the temperature range of 300 to 350° C. (Table 2C) indicate that the branching reaction through the reaction of the incorporated DMBPC alkylated monomer residues is dependent upon the amount of alkylated monomer (i.e. DMBPC) incorporated in the polymer in this temperature range. For example the 100% DMBPC homopolymers (interfacial and melt), which were compounded (melt-mixed) for 40 minutes at 350° C. show increases in polydispersity as compared to polymers having less DMBPC monomer that is treated under the same conditions. Further, although the two starting polymers (i.e. 100% DMBPC melt and interfacial) in these examples have similar molecular weight properties, the increase in polydispersity was much greater in the case of the DMBPC homopolymer prepared by the melt (DPC) polymerization method. It is believed that this greater increase in the polydispersity of the melt (DPC) homopolymer is due to a contribution to the polydispersity from Fries-branching. Fries-branching is a reaction which is known to occur at elevated temperatures in melt polycarbonates due to their use of alkali metal hydroxides as catalysts.

3. Treating the Polycarbonate During Molding

Example 1

Various polymers made by melt polymerization using an activated carbonate (BMSC) were treated during molding. Before molding pellets were dried for 2-3 hrs at an elevated temperature most suitable for the polymer concerned. The drying was done for 2 hours at 120 C for the BPA-homopolymer, for 3 hours at 105° C. for the Terpolymer (BPA/HQ/MeHQ), 2 hours at 120° C. for the Copolymer (BPA/HQ), 2 hours at 120° C. for the DMBPC-homopolymer, and 3 hours at 105° C. for the Terpolymer (DMBPC/HQ/MeHQ). The values given for the starting pellets are an average of the values of the different production lots of pellets used to make the starting mixture of pellets.

The molding machine used was an Engel 45T which was equipped with an insert mold yielding a plaque of 60×60×2.5 mm. Molding was started using the condition I in Table 3. After starting and stabilizing the machine for a minimum of 5 shots, plaques were produced based on a melt with a fixed residence time in the barrel of the molding machine of about 180 seconds. After collecting the desired number of plaques the cooling time was increased from 20 to 344 seconds (condition II table 3). After 5 transition plaques, again a stable operation was obtained and plaques with a residence time of about 33 minutes were produced. The transition plaques were also collected for evaluation as these have intermediate residence times that stepwise increases from 3 to 33 minutes. As a result plaques with the following residence time were produced: 180 seconds (condition I), 540 seconds, 900 seconds, 1360 seconds, 1620 seconds (all transition conditions) and 1980 seconds (condition II).

TABLE 3

Molding conditions for controlled branch molding

| | | Machine Engel 45T | |
|---|---|---|---|
| Condition | UOM | I | II |
| Temp. Hopper | ° C. | 40 | 40 |
| Temp. zone 1 | ° C. | 320 | 320 |
| Temp. Zone 2 | ° C. | 330 | 330 |
| Temp. Zone 3 | ° C. | 340 | 340 |
| Temp. Nozzle | ° C. | 335 | 335 |
| Temp. Mold | ° C. | 85-90 | 85-90 |
| Holding time | sec | 10 | 10 |
| Cooling time | sec | 20 | 344 |
| Cycletime | sec | 36 | 360 |
| Residence time | sec | 180 | 1980 |

TABLE 4

Results of treating the polycarbonate during molding

| Samples | Residence Time (min) at T (melt) = 340 C. | Mw (PS) | Mn (PS) | Mw (PC) | Mn (PC) | Pd |
|---|---|---|---|---|---|---|
| BPA-Based Homopolymer | 0 | 58493 | 25259 | 29520 | 12790 | 2.31 |
| | 3 | 57312 | 24980 | 28683 | 12502 | 2.29 |
| | 15 | 54790 | 23567 | 27624 | 11882 | 2.32 |
| | 33 | 55743 | 23758 | 28024 | 11944 | 2.35 |

TABLE 4-continued

Results of treating the polycarbonate during molding

| Samples | Residence Time (min) at T (melt) = 340 C. | Mw (PS) | Mn (PS) | Mw (PC) | Mn (PC) | Pd |
|---|---|---|---|---|---|---|
| Terpolymer: | 0 | 56041 | 24394 | 28150 | 12253 | 2.3 |
| 33:34:33 | 3 | 53198 | 22160 | 26956 | 11229 | 2.4 |
| BPA:HQ:MeHQ | 15 | 55349 | 20526 | 27859 | 10331 | 2.7 |
|  | 33 | 58359 | 20630 | 29124 | 10296 | 2.83 |
| Copolymer 70:30 | 0 | 56712 | 24710 | 28432 | 12389 | 2.29 |
| BPA:HQ | 3 | 57259 | 24750 | 28661 | 12389 | 2.31 |
|  | 15 | 55452 | 23222 | 27902 | 11685 | 2.39 |
|  | 33 | 56834 | 23337 | 28482 | 11696 | 2.44 |
| Terpolymer | 0 | 53802 | 23098 | 27210 | 11683 | 2.33 |
| 33:34:33 | 3 | 53986 | 22900 | 27287 | 11575 | 2.36 |
| BPA:HQ:MeHQ | 15 | 54438 | 21923 | 27477 | 11065 | 2.48 |
| stabilized | 33 | 59275 | 22231 | 29509 | 11067 | 2.67 |
| DMBPC-based | 0 | 46766 | 20391 | 24253 | 10575 | 2.29 |
| Homopolyer | 3 | 50058 | 20620 | 25637 | 10560 | 2.43 |
|  | 15 | 56677 | 19551 | 28417 | 9803 | 2.9 |
|  | 33 | 59597 | 18666 | 29644 | 9285 | 3.19 |
| Terpolymer | 0 | 57020 | 24150 | 28562 | 12097 | 2.35 |
| 33:34:33 | 3 | 59046 | 23249 | 29413 | 11581 | 2.54 |
| DMBPC:HQ:MeHQ | 15 | 63837 | 22016 | 31426 | 10838 | 2.9 |
|  | 33 | 66537 | 20851 | 32560 | 10204 | 3.19 |

Similar conclusions can be drawn from the data in Table 4 as in previous Table 2. It is necessary for the polycarbonate to contain at least one monomer alkyl-substituted (e.g. alkylated) phenol or bisphenol in order for the branching reaction to occur. For example, there is a significant increase in polydispersity in the case of the terpolymer with MeHQ, DMBPC homopolymer, and the copolymer with MeHQ; whereas there is no significant increase in polydispersity in the case of the BPA homopolymer or the copolymer with HQ.

Example 2

Another set of data was compiled for two other molding conditions (III and IV) of MeHQ terpolymer containing various stabilizing additives. Table 5 shows the molding conditions for the Engel 45 T molding machine used for the tests.

TABLE 5

Molding conditions on molding machine (Engel 45T)

| Condition | Units | III | IV |
|---|---|---|---|
| Temp Hopper | C. | 40 | 40 |
| Temp Zone 1 | C. | 280 | 320 |
| Temp Zone 2 | C. | 290 | 330 |
| Temp Zone 3 | C. | 300 | 340 |
| Temp Nozzle | C. | 295 | 335 |
| Temp Mold | C. | 90 | 100 |
| Holding time | Seconds | 10 | 10 |
| Cooling time | Seconds | 20 | 1238 |
| Cycle time | Seconds | 36 | 144 |
| Residence time | Seconds | 180 | 720 |

The polycarbonate used in these samples was prepared by a melt polymerization reaction using BMSC according to the following description. The polymerization reaction was carried out in the reactor system shown schematically in FIG. 1. In this system the oligomerization vessel A is charged at ambient temperature and pressure with the solid diol monomers. The mol % of monomers in the terpolymers was 33% BPA, 34% hydroquinone (HQ), and 33% methyl hydroquinone (MeHQ). The PCP chainstopper was added in an amount to yield approximately 50 mol % of PCP end groups at the targeted molecular weight. The catalysts tetramethyl ammonium hydroxide and sodium hydroxide were next added as an aqueous solution. The tetramethyl ammonium hydroxide was used at a concentration of 25 mEq/mol diol and the sodium hydroxide at a concentration of 4 mEq/mol BPA in the case of homopolymer and at a concentration of 2 mEq/mol BPA in the case of terpolymer. After this the oligomerization reactor was sealed shut. The system was deoxygenated by briefly evacuating the oligomerization reactor and then introducing nitrogen. This process was repeated three times. After a period of at least approximately 4 hours, an additional amount of sodium hydroxide was added to the molten terpolymer oligomer at a concentration of 6 mEq/mol diol.

The molten oligomer was then fed to a ZSK-25 extruder C by means of pump and feedline 1. The ZSK-25 extruder is a 25 mm diameter, twin screw, co-rotating intermeshing extruder having a length to diameter ratio (L/D) of about 59. The oligomer was fed to the extruder at a rate of about 12 to 14 kg/h, and the screw speed was about 300 rpm. The barrels of the extruder were set at 300° C. and the die head at 310° C. The Z-SK 25 extruder is equipped with a high and low vacuum system to remove the methyl salicylate formed as a byproduct in the polycondensation reaction. The low vacuum system consists of line 2, condenser D, Vacuum pump F and MS holding tank H. The high vacuum system consists of line 3, condenser E, Vacuum pump G and MS holding tank I. The two low vacuum vents are operated at a vacuum level of about 14 to 20 mbar, and the subsequent four high vacuum vents are operated at a vacuum level of about 0.5 to 4 mbar. The extruder was operated under conditions of temperature, vacuum, residence time, and mixing intensity sufficient to promote polymerization.

The terpolymer prepared above was then compounded with various stabilizing agents as described in U.S. provisional application 60/806,304 filed on Jun. 30, 2006 which is incorporated herein by reference. The polycarbonate materials were compounded on a W&P ZSK25 twin-screw extruder. The additives were manually premixed with polycarbonate resin powder and further homogenized using a shaking device. This polycarbonate premix was then fed to the extruder together with the S-Polycarbonate material in a 1:19 ratio. The barrel temperature of the extruder was set at 300° C. while a vacuum in the range of 150-350 mbar was applied. The extruded polymer strands were briefly cooled by passing them through a water bath and finally pelletized before further processing. Table 6 illustrates the amount of stabilizer compounded with the terpolymer in each sample. Table 7 illustrates the results after molding in terms of polydispersity values at each step and at conditions III and IV.

TABLE 6

Additive amounts

| Sample No. | Additive | Amount (ppm) |
|---|---|---|
| 4 | None | 0 |
| 5 | H3PO3 | 2 |
| 6 | H3PO3 | 9 |
| 7 | H3PO3 | 15 |
| 8 | (NH4)2HPO4 | 3 |
| 9 | (NH4)2HPO4 | 14 |
| 10 | (NH4)2HPO4 | 25 |

TABLE 7

Polydispersity results

| Sample No. | Start pellets | Compounded pellets | Condition III | Condition IV |
|---|---|---|---|---|
| 4 | 2.61 | 2.63 | 2.73 | 2.83 |
| 5 | 2.61 | 2.57 | 2.58 | 2.76 |
| 6 | 2.61 | 2.60 | 2.68 | 2.77 |
| 7 | 2.61 | 2.59 | 2.63 | 2.69 |
| 8 | 2.61 | 2.58 | 2.62 | 2.76 |
| 9 | 2.61 | 2.59 | 2.63 | 2.68 |
| 10 | 2.61 | 2.58 | 2.63 | 2.71 |

As can be seen in table 7 the polydispersity of the samples increases with polycarbonate derived from alkylated monomers. Further, this increase is dependent not only upon the temperature of the molding step but also upon the residence time of the polycarbonate at the elevated temperature during the molding process. This conclusion can be observed when comparing the polydispersities of condition III (lower temperatures and a residence time of 180 seconds) to condition IV (higher temperature and a 720 second residence time).

Detectable NMR Peak

Figure 2:
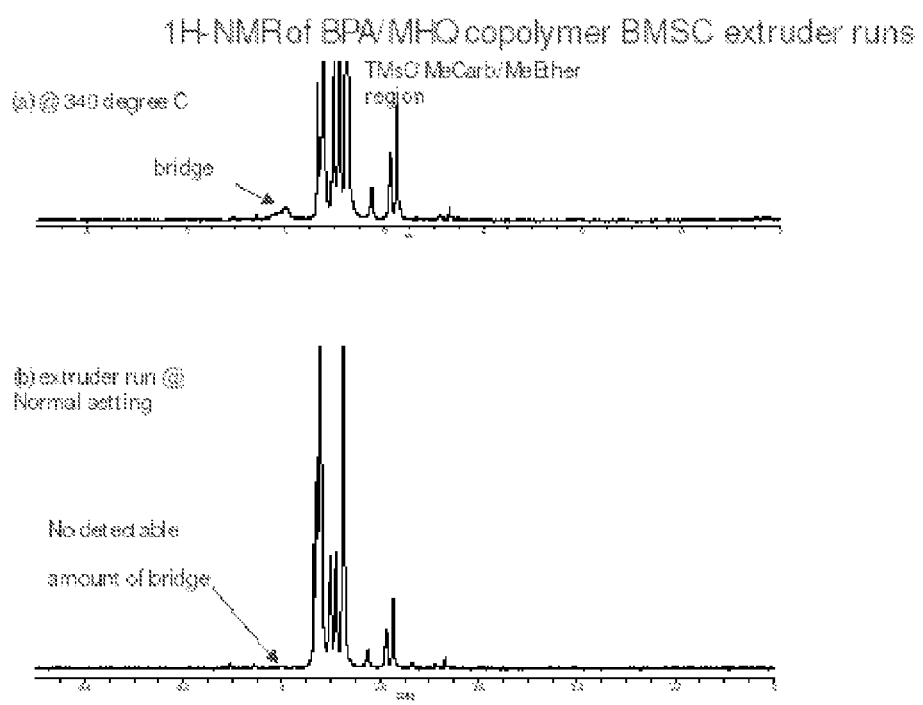
FIG. 2 illustrates 2 different proton NMR spectra of a polycarbonate.

As shown below in FIG. 2, a specific very broad peak (about 0.05 ppm in width) centered at a chemical shift of about 3.99 ppm appeared in the proton NMR spectra of the samples having an elevated polydispersity. This NMR spectral feature is absent in the proton NMR spectra of the untreated polymers not having an elevated polydispersity or melt strength (MIR). The relative intensity of this feature compared to an internal standard (e.g. the proton NMR peak assigned to the methyl substituent of the incorporated methyl-substituted monomer in the polymer), qualitatively correlates with the increases seen in the Pd and MIR values. No J-coupling was observable for this new NMR peak, as expected for a methyl group coupling together two aromatic rings. This broad peak could not be assigned to only one specific branching structural feature because a variety of such branching species can be formed in the branching reaction. It is estimated that this method has a detection limit for these branching units of approximately 0.05 mole % relative to the total $CH_3$ content of the monomer (e.g. sum of the moles of $CH_3$ from incorporated BPA and MeHQ units).

Summary of the Examples

Branching has been found to occur when a special elevated temperature heat treatment is carried out on polycarbonates containing such alkyl-substituted diols as methyl hydroquinone, t-butyl hydroquinone, or DMBPC. Suitable polycarbonates may be prepared using the interfacial polymerization or melt polymerization (DPC or BMSC) methods. The branching reaction causes an increase in the melt strength, as evidenced by an increase in MIR and an increase in the polydispersity of the treated polymer. Along with this increase in MIR and Pd, a new broad band centered at a chemical shift of about 3.99 ppm is observed to develop in the proton NMR. The increase in this NMR feature correlates qualitatively with the increase in branching (Pd) and melt strength (MIR or R*).

No significant increase in polydispersity (Pd) or MIR or branching is observed to occur when polycarbonates containing only non-alkyl-substituted diols such as BPA or hydroquinone are similarly treated.

tB-HQ Polycarbonate

According to the above examples and disclosure tB-HQ is a preferred alkylated monomer for incorporating into polycarbonate. Tertiary Butyl Hydroquinone (CAS#1948-33-0) is supplied by Acros, catalogue number 15082. Other commercial suppliers include; Dalian (China), Hunan (China), Jan Dekker (the Netherlands), Camlin (India). tB-HQ polycarbonate can be prepared by a melt polymerization reaction using either DPC or BMSC as a carbonate source.

Melt Polymerization with tB-HQ Using DPC

A 20% tBHQ copolymer with BPA was prepared by melt transesterification reaction (LX), carried out in a 25 gram scale batch reactor. To remove any sodium from the glass the reactor was soaked in 1M HCl for at least 24 hours followed by rinsing at least 5 times with 18.2 M ohm. The temperature of the reactor was maintained using a heating mantle with a PID controller. The pressure over the reactor was controlled by a nitrogen bleed into a vacuum pump downstream of the distillate collection flasks and measured with a pressure gauge. Catalyst solutions where prepared by diluting tetramethyl ammonium hydroxide (Sachem, 25% in water) and NaOH (Acros, 0.5 mol/l) to the proper concentrations with 18.2 M ohm water. Reactions where carried out in the presence of $2.5 \times 10^{-4}$ mol of TMAH/mol diol, which was added in 100 microliter together with the $2.5 \times 10^{-6}$ mol of NaOH/mol diol. The total amount of catalyst solution added is maintained at 100 microliter. The glass reactor tube was charged with the solid BPA (0.08645 mol), solid tBHQ (0.02161 mol) and solid DPC (0.1167 mol), targeted molar ratio 1.08 (carbonate/sum of dihydroxy compounds). The reactor was then assembled, sealed and the atmosphere was exchanged with nitrogen three times. The catalyst was added to the monomers. The reactor was brought to near atmospheric pressure. During polymerization the overhead of the reactor system is maintained at 100° C. The following temperature/pressure profile was used.

Melting; 180° C., 1000 mbar, (stirring is started after 6 min), 10 minutes

Step 1; 230° C., 170 mbar, 60 minutes

Step 2; 270° C., 20 mbar, 30 minutes

Step 3; 300° C., full vacuum (~0.5 mbar), 30 minutes

After completion of the polymerization, the reactor is brought back to atmospheric pressure with a gentle nitrogen flow. When atmospheric pressure is reached, the stirrers are stopped and the produced material is drained from the reactor tubes by opening the reactors at the bottom and pushing out the material with a slight nitrogen over-pressure. The harvested material is then used for analysis. The reaction yielded in a slightly yellow, transparent polymer with molecular weight of 35 kg/mol (relative to Polystyrene), Pd of 2.50.

Melt Polymerization with tB-HQ Using BMSC:

An 80/20 (mol/mol) polycarbonate copolymer of tert-butyl hydroquinone and BPA was made via the BMSC/melt reactive extrusion process. The samples were synthesized as follows. A stainless steel stirred tank reactor was charged with 6100 g BPA, 17767 g tert-butyl HQ (TBHQ), and 44971 g BMSC to give a molar ratio of [carbonate]/[diol] equal to about 1.017. Also added to the reactor was an aqueous catalyst solution of tetramethyl ammonium hydroxide (TMAH) and sodium hydroxide (NaOH) in an amount corresponding to $5.0 \times 10^{-5}$ moles TMAH and $4.0 \times 10^{-6}$ moles of NaOH per total number of moles of BPA/TBHQ. The reactor was then evacuated and purged with nitrogen three times to remove residual oxygen and then held at a constant vacuum pressure of 800 mbar. The reactor was then heated to 170° C. in order to melt and react the mixture. After approximately 4 hr 15 min from the start of heating (of the reactor tank), the reactor was pressurized with nitrogen to a constant overpressure of 0.9 bar, and the molten reaction mixture was fed through a 170° C. heated feed-line into an extruder at a rate of about 10 kg/h. 15 Minutes before starting the feed to the extruder an aqueous catalyst solution of sodium hydroxide (NaOH) in an amount corresponding to $17.0 \times 10^{-6}$ moles of NaOH per total number of moles of BPA/TBHQ. The extruder is a W&P ZSK25WLE 25 mm 13-barrel twin-screw extruder with an L/D=59. The feed into the extruder comprised a flash-valve to prevent boiling of the molten mixture. The reaction mixture was reactively extruded at a screw speed of 300 rpm. The extruder was equipped with five forward vacuum vents and one back-vent. The methyl salicylate byproduct is removed via devolatilization through these vents. The vacuum pressure of the back-vent was 11 mbar. The vacuum pressure of the first forward vent was 3 mbar. The vacuum pressure of the final four forward vents was less than 1 mbar. This TBHQ/BPA (80/20) copolymer has been made with all the extruder barrels at a temperature of 270° C. and the extruder die head at a temperature of 280° C.

The invention claimed is:

1. A method of increasing the branching and polydispersity of a polycarbonate comprising the steps of:

(a) including in the polycarbonate at least one species of an alkyl substituted monomer, and
    (b) treating the polycarbonate at an elevated temperature and for a sufficient time to increase the branching and polydispersity relative to an otherwise equivalent polycarbonate without alkyl substituents wherein treatment step (b) occurs during a compounding step at a temperature greater than 330° C. for greater than or equal to 20 minutes.

2. The method of claim 1, wherein the at least one species of alkyl substituted monomer is selected from the group consisting of:

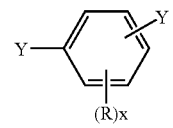

(a)

wherein each substituent Y is independently a hydroxy, an alcohol, an ester, or a carboxylic acid functional group, each substituent R is independently a $C_1$ to $C_6$ branched, linear, or cyclic aliphatic group, each x is an integer between 1 and 4 inclusive, and the sum of all x's is less than or equal to 4,

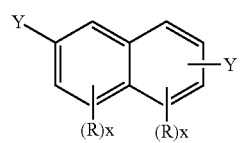

(c)

wherein each substituent Y is independently a hydroxy, an alcohol, ester or carboxylic acid functional group, each substituent R is independently a $C_1$ to $C_6$ branched, linear, or cyclic aliphatic group, each x is zero or an integer between 1 and 3 inclusive, and the sum of all x's is at least 1 and less than or equal to 6, and

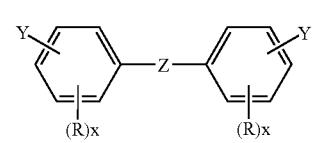

(e)

wherein each substituent Y is independently a hydroxy, an alcohol, ester or carboxylic acid functional group, each substituent R is independently a $C_1$ to $C_6$ branched, linear, or cyclic aliphatic group, each x is zero or an integer between 1 and 4 inclusive, the sum of all x's is at least 1 and less than or equal to 8, and Z represents one of the groups of formula:

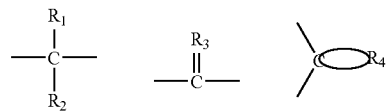

wherein $R_1$, $R_2$ and $R_3$ are independently a $C_1$ to $C_{18}$ branched, linear, or cyclic aliphatic group, and $R_4$ is a $C_3$ to $C_{12}$ cyclic substituent.

3. The method of claim 2, wherein each R substituent is independently a $C_1$ to $C_4$ branched or linear aliphatic group.

4. The method of claim 3, wherein each R substituent is independently a $C_1$ or a $C_2$ aliphatic group.

5. The method of claim 1, wherein at least one species of alkyl substituted monomer is selected from the group consisting of methylhydroquinone, tert-butylhydroquinone, DMBPC bis(3-methyl-4-hydroxyphenyl)cyclohexane, 2,2'-Thiobis (4-t-octylphenol), TMBPA (tetra-methyl-BPA), DMBPA (di-methyl-BPA), DEBPA (di-ethyl-BPA), di-ortho-isopropyl-BPA, di-ortho-sec-butyl-BPA, di-ortho-tert-butyl-BPA, bis-orthocresol flourene, methyl resorcinol, di-tert-butyl resorcinol, and di-tert-butyl hydroquinone.

6. The method of claim 5, wherein at least one species of alkyl substituted monomer is tert-butyl hydroquinone.

7. The method of claim 1, wherein alkyl substituted monomer is present in the polycarbonate in an amount greater than 10 mole percent based on the total moles of monomers in the polycarbonate.

8. The method of claim 7, wherein the alkyl substituted monomer is present in the polycarbonate in an amount greater than 20 mole percent based on the total moles of monomers in the polycarbonate.

9. The method of claim 1, wherein the step of treating the polycarbonate at an elevated temperature and for a sufficient time to increase the branching and polydispersity relative to an otherwise equivalent polycarbonate without alkyl substituents further occurs during a melt transesterification reaction to build molecular weight of the polycarbonate.

10. The method of claim 9, wherein during the melt polymerization reaction the polycarbonate is treated at an elevated temperature and for a sufficient time to result in a polycarbonate having a polydispersity of greater than 2.3.

11. The method of claim 10, wherein during the melt polymerization reaction the polycarbonate is treated at an elevated temperature and for a sufficient time to result in a polycarbonate having a polydispersity of greater than 2.5.

12. The method of claim 9, wherein during the melt polymerization reaction the polycarbonate is treated at a temperature of greater than 330° C.

13. The method of claim 9, wherein during the melt polymerization reaction the polycarbonate is treated at a temperature of greater than 340° C.

14. The method of claim 1, wherein during the compounding step the polycarbonate is treated at an elevated temperature and for a sufficient time to increase the polydispersity of the polycarbonate by greater than 10 percent.

15. The method of claim 14, wherein during the compounding step the polycarbonate is treated at an elevated temperature and for a sufficient time to increase the polydispersity of the polycarbonate by greater than 50 percent.

16. The method of claim 1, wherein the compounding step occurs at a temperature greater than 340° C.

17. The method of claim 1, wherein the compounding step occurs for greater than or equal to 40 minutes.

18. The method of claim 17, wherein the compounding step occurs for greater than or equal to 60 minutes.

19. The method of any of claims 1, wherein the step of treating the polycarbonate at an elevated temperature and for a sufficient time to increase the branching and polydispersity relative to an otherwise equivalent polycarbonate without alkyl substituents further occurs during a molding step.

20. The method of claim 19, wherein during the molding step the polycarbonate is treated at an elevated temperature and for a sufficient time to increase the polydispersity of the polycarbonate by greater than 10 percent.

21. The method of claim 20, wherein during the molding step the polycarbonate is treated at an elevated temperature and for a sufficient time to increase the polydispersity of the polycarbonate by greater than 50 percent.

22. The method of claim 19, wherein the molding step occurs at an elevated temperature for a period of time greater than 10 minutes.

23. The method of claim 22, wherein the molding step occurs at an elevated temperature for a period of time greater than 20 minutes.

24. The method of claim 1, wherein the polycarbonate is treated at an elevated temperature and for a sufficient time to produce a polycarbonate having a broad NMR band centered at a chemical shift of between about 3.95 and 4.05 ppm in a proton NMR spectrum.

* * * * *